Dec. 25, 1945.   J. F. HENNESSY   2,391,571
BARBECUING ATTACHMENT FOR DOMESTIC COOKING RANGES
Filed Sept. 5, 1941   3 Sheets-Sheet 1
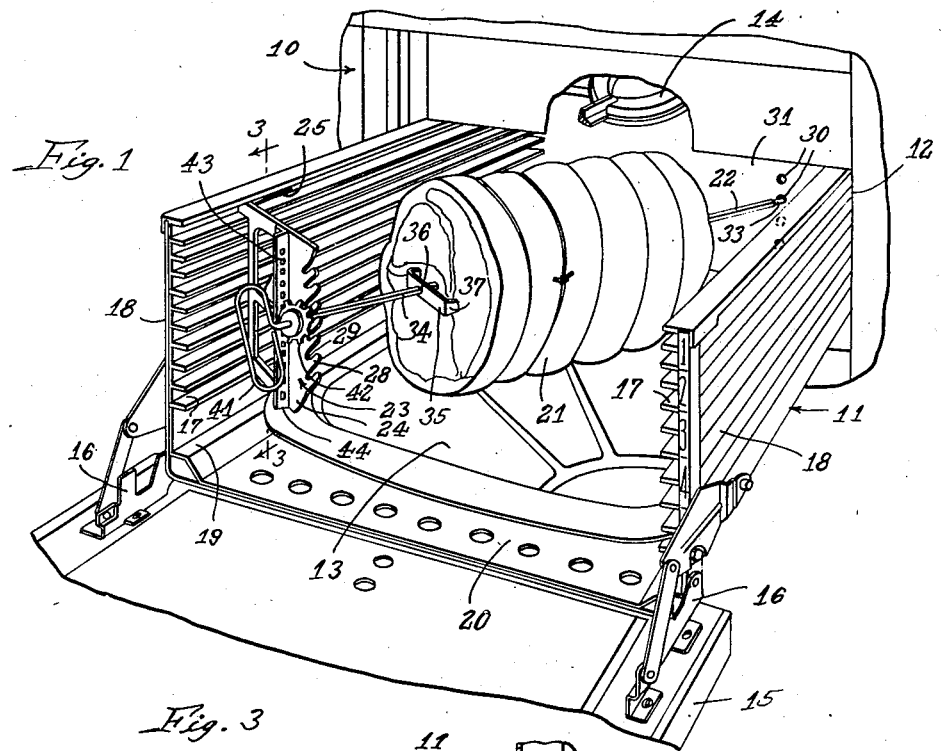
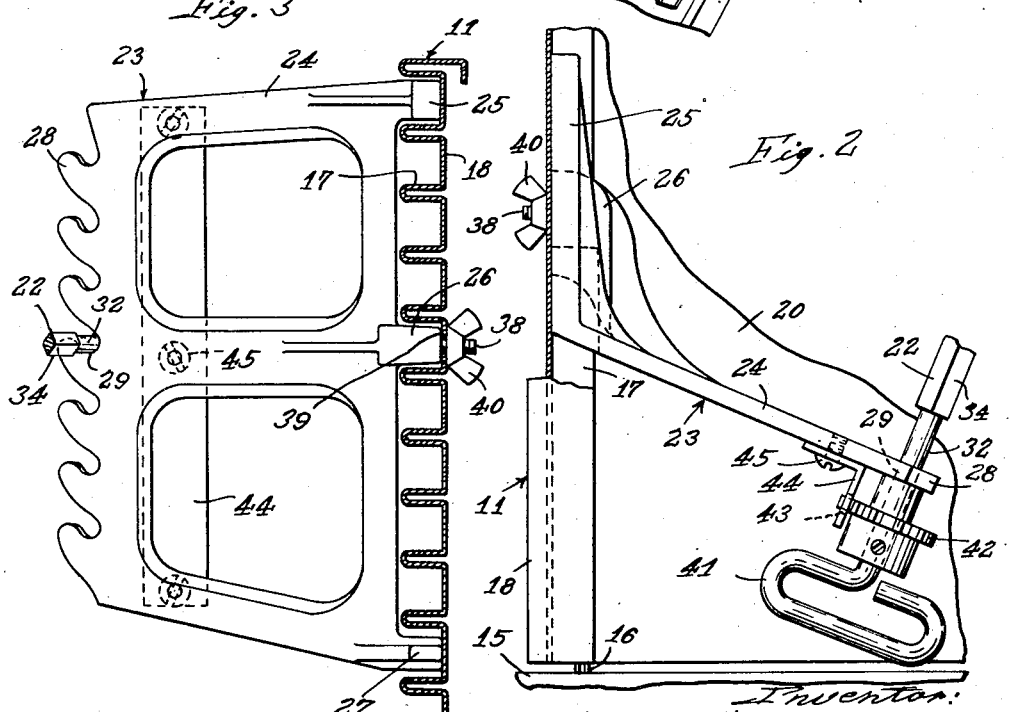

Dec. 25, 1945. J. F. HENNESSY 2,391,571
BARBECUING ATTACHMENT FOR DOMESTIC COOKING RANGES
Filed Sept. 5, 1941 3 Sheets-Sheet 2
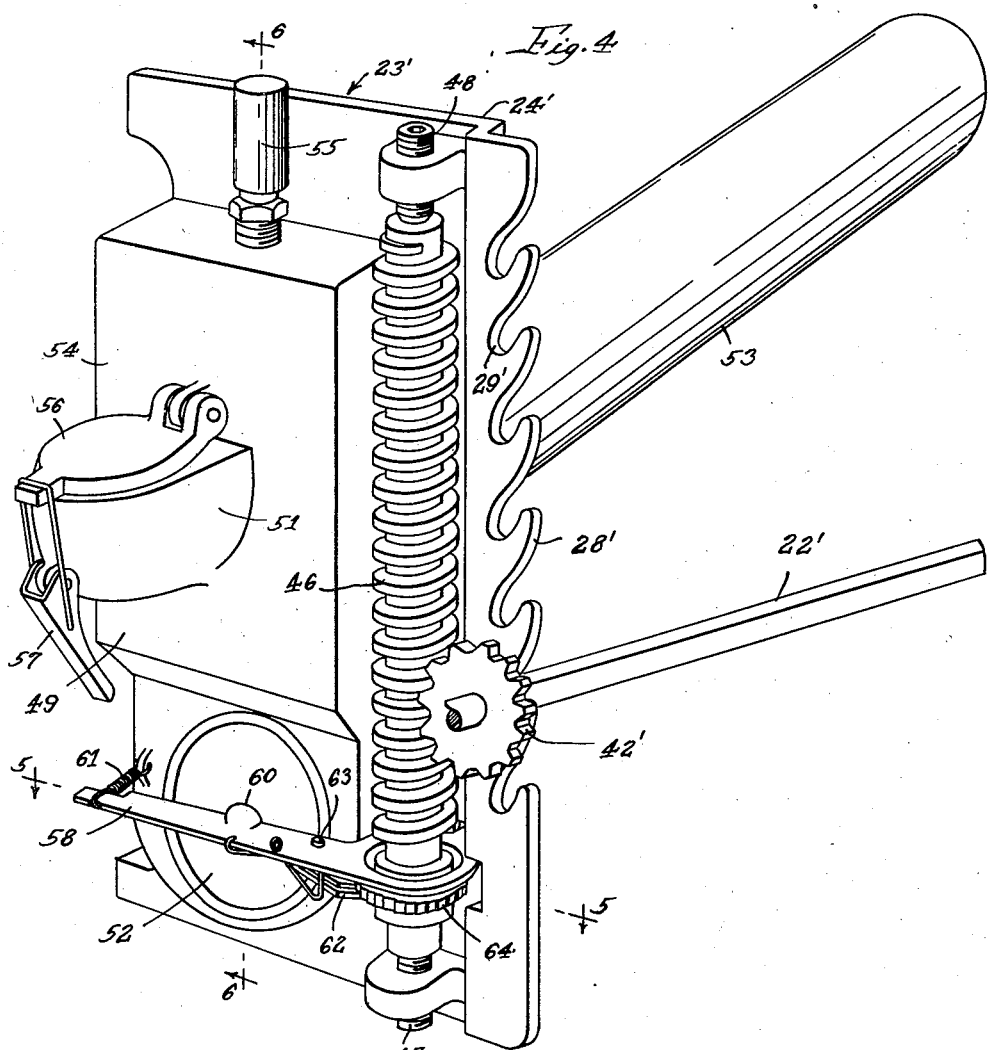
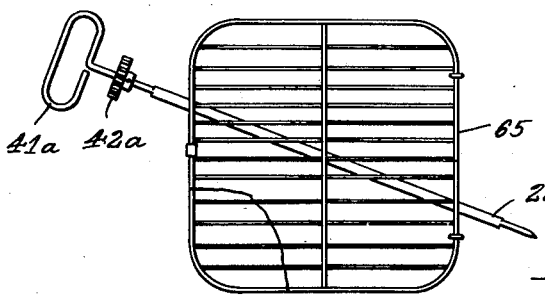
Inventor:
John F. Hennessy
By McCanna, Winterrown & Marzbach
Attys.

Dec. 25, 1945. J. F. HENNESSY 2,391,571
BARBECUING ATTACHMENT FOR DOMESTIC COOKING RANGES
Filed Sept. 5, 1941 3 Sheets-Sheet 3
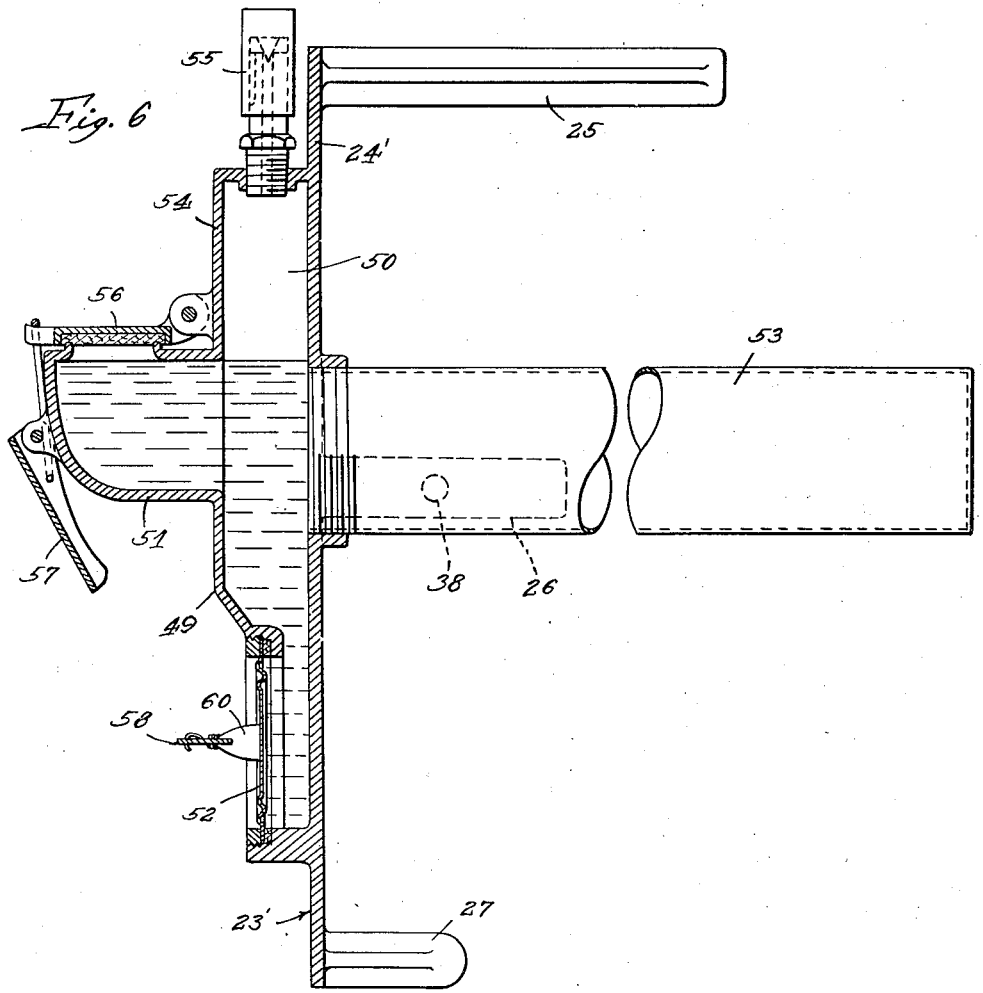
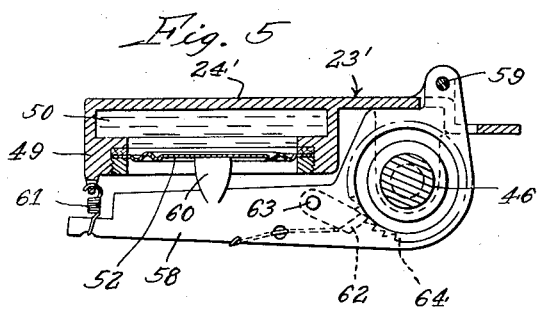
Inventor:
John F. Hennessy
By McCanna, Winterrow & Marsbach
Attys.

Patented Dec. 25, 1945

2,391,571

UNITED STATES PATENT OFFICE 2,391,571

BARBECUING ATTACHMENT FOR DOMESTIC COOKING RANGES

John F. Hennessy, Rockford, Ill., assignor to Geo. D. Roper Corporation, Rockford, Ill., a corporation of Illinois Application September 5, 1941, Serial No. 409,725

20 Claims. (Cl. 126—41)

This invention relates to a barbecuing attachment for domestic cooking ranges.

The principal object of my invention consists in the provision of an attachment for the broiler drawer of a domestic cooking range so that meat and fowl may be broiled while it is revolved intermittently or continuously in the heat zone of the gas burner or electric heating element, an important feature of the attachment being the fact that it may be applied and removed very easily, thus permitting the use of the broiler drawer in the conventional way for ordinary broiling, toasting, etc., the entire attachment being removable.

Another object of the invention consists in the provision of a novel steam propelled motor for revolving the spit, the steam generator for the motor relying for its heat on the burner or heating element used in the broiling of the meat, and the motor having novel operating connections with the spit so as to cause the turning at a satisfactory rate.

The invention is illustrated in the accompanying drawings, in which—

Figure 1 is a perspective view of a portion of a domestic gas range showing the barbecuing attachment of my invention applied to the broiler drawer;

Fig. 2 is a plan view of the front corner portion of the drawer showing the arrangement of the bracket and spit handle in relation to the side of the drawer and the hinged door, respectively, a portion of the drawer being shown in section to better illustrate the manner of attachment of the bracket;

Fig. 3 is a vertical sectional detail on the line 3—3 of Figure 1;

Fig. 4 is a perspective view of another barbecuing attachment embodying a steam generator and a diaphragm type motor operable by steam pressure to turn the spit continuously throughout the barbecuing operation;

Figs. 5 and 6 are sectional views on the lines 5—5 and 6—6 of Fig. 4, and

Fig. 7 is a plan view of a steak and hamburger grill adapted to be used interchangeably with the spits shown in Figs. 1 and 4.

Similar reference numerals are applied to corresponding parts throughout the views.

Referring first to Figs. 1–3, the numeral 10 designates a domestic kitchen range having a broiler drawer 11 slidable into and out of the broiling compartment 12 in the upper portion of which a gas burner or electric heating element is provided for the broiling of foods placed on a grill in the broiler tray 13. A gas burner is indicated at 14 in the upper portion of the broiler compartment. 15 is a door hingedly connected as at 16 to the lower portion of the drawer 11 at the front end thereof and arranged when opened to be supported by its hinges in a substantially horizontal position as illustrated in Figure 1. When the drawer is pushed in with the door swung up to a substantially vertical position, the door closes the front end of the compartment 12. The drawer 11 has a plurality of ledges 17 on the two side walls 18 which are vertically spaced to permit placing the tray 13 with the grill thereon at any one of a plurality of different elevations in the broiling of steaks and chops and other foods in the usual way. The ledges 17 are correspondingly spaced so that the tray 13 rests substantially horizontally when placed on corresponding ledges. The markings "1," "2," "3," "4," etc., on the front end of the drawer serve to indicate to the housewife at which elevation the tray should be placed in the broiling of any specific food, these numbers corresponding to numbers in a chart of foods usually provided on the inside of the broiler door, as described in the copending application of Stanley H. Hobson, Serial No. 343,983, filed July 5, 1940. When the drawer 11 is being used for barbecuing, the tray 13 is placed on the lowermost ledge 19 just above the bottom 20 of the drawer to catch the drippings from the meat 21 being barbecued, the meat being supported on a skewer or spit 22 forming a part of the barbecuing attachment indicated generally by the reference numeral 23.

The barbecuing attachment 23 comprises in addition to the spit 22 a bracket 24 which is preferably cast to a generally L-shaped section as indicated in Fig. 2 to provide attaching portions 25, 26 and 27 on one leg of the L for engagement with the side wall 18 of the drawer, and a notched support 28 on the other leg of the L for support of the front end portion of the spit 22 selectively in any one of the notches 29 provided in vertically spaced relation in said support. The rear end of the spit 22 is engageable selectively in any one of a plurality of holes 30 provided in vertically spaced relation in the rear wall 31 of the drawer 11. The bracket 24, it will be noticed, is fastened to one side wall of the drawer, and the holes 30 are provided near the opposite side wall so that the spit 22 extends substantially diagonally with respect to the drawer. This is of great advantage because larger roasts can be accommodated, there being a greater length of supporting spit. The spit is of circular section at the front and rear ends as indicated at 32 and 33 in Figs. 2 and 1, respectively, but of relatively enlarged square section between the ends, as indicated at 34 in Figs. 2 and 3, and a crosshead 35 has a square hole 36 receiving the square portion of the spit therein with a close working fit so that the roast or other meat to be barbecued can be staked in place between crossheads applied to the opposite ends of the meat with the prongs 37 on the ends of the crossheads driven into the meat. The meat will therefore be held against turning with respect to the spit and can be turned by means of the spit as required in barbecuing. The portions 26—27 of the bracket 24 fit between neighboring ledges 17, and the bracket can therefore be held in place with a single stud 38 without danger of the bracket turning with respect to the drawer from its substantially vertical operative position. The stud 38 is provided on the bracket portion 26 and entered through a hole 39 in the side wall 18 to receive a wing nut 40 threaded on the projecting end of the stud and tightened against the outer side of the drawer. There is ample clearance for the stud 38 and wing nut 40, and the drawer can therefore be closed without danger of either of these parts scraping on the side of the drawer opening in the range.

In most of the barbecuing devices intended for use on domestic ranges it was considered necessary to provide electric motors for drive purposes and complicated and expensive reduction gearing between the motor and spit. However, I have found that it is entirely practical to barbecue meat satisfactorily if the meat is turned periodically by hand. The turning can be timed with the timer usually provided as an accessory on the range. I have therefore disclosed a T-shaped handle end 41 on the spit 22, which as indicated in Fig. 2, is disposed immediately behind the door 15 when the door is closed, and is also disposed far enough from the side wall 18 of the drawer to permit easy turning by hand when the door 15 is swung down out of the way as in Figure 1. A small gear 42 fixed on the front end of the spit behind the handle 41 engages in rack teeth 43 provided by holes punched in vertically spaced relation in a small angle iron strip 44 fastened to the bracket 24 next to the notched supporting portion 28 thereof as by means of screws 45. When the housewife wants to turn the meat, the gear 42 is disengaged by a slight lift on the handle 41, whereupon the spit can be turned and the gear 42 reengaged with the rack 43. The cylindrical end portions 32 and 33 of the spit form axle portions on which the spit can be turned easily with respect to the notch 29 and hole 30. In mounting the spit in the drawer the housewife will select the proper hole 30 and proper notch 29 to suit the size of the piece of meat to be barbecued and bring the meat in the desired spaced relationship to the burner 14 for faster or slower barbecuing. After the meat has been barbecued it is a simple matter to remove the spit with the meat on it from the drawer, and then if the drawer is to be used later for ordinary broiling, the attachment 23 can be removed by merely removing the wing nut 40 and withdrawing the bracket 24.

In Figs. 4–6 I have illustrated an attachment 23' of modified or alternative construction in which the bracket 24' is cast to a form generally similar to that of the bracket 24 in so far as its being L-shaped in horizontal section is concerned, and also in so far as its manner of attachment to the side of the drawer is concerned. The spit 22' is like the spit 22, and is arranged to be supported in the rear end of the broiler drawer in the same way as the spit 22. The notched support 28' corresponds to the support 28 and is adapted to support the front end of the spit for rotation under power, the gear 42' fixed on the front end of the spit 22' being rotatable intermittently in one direction by the turning of a power operated screw 46 with which the gear 42' meshes. The screw 46 is mounted between centers 47 and 48 on the lower and upper ends of the bracket 24', and is disposed in spaced parallel relation to the notched support 28' so that the gear 42' may be meshed with the screw when placed in any one of the series of notches 29' provided in the support. The bracket 24' has a water reservoir 49 cast integral therewith providing a chamber 50 extending from a point above the filling spout 51 down to a point below the lower edge of a flexible diaphragm 52. A brass tube 53 communicates with the chamber 50 and extends rearwardly from the bracket 24' substantially parallel with the side of the broiler drawer so that a substantial portion of the length thereof lies in the heat zone of the burner 14 or electric heating element in the broiler compartment of the range. The tube 53, in other words, is the steam generator or heating coil for the steam power unit, and it will be noticed that it is disposed below the level of the filling spout 51 so that it will be filled with water when the chamber 50 is filled to the level of the spout. The upper portion 54 of the reservoir forms what may be called a steam dome between the level of the spout and the relief valve 55 mounted on the upper end of the reservoir 49 in communication with the steam chamber. A hinged closure 56 fitted with a suitable gasket may be clamped down onto the spout 51 to seal it after the reservoir 49 and tube 53 have been filled, a clamping device for this purpose being indicated at 57. A rocker arm 58 is pivoted at one end at 59 on the bracket 24' and has operative engagement with the diaphragm 52 at 60 intermediate the ends of the arm, and has a coiled tension spring 61 attached to the free end thereof to urge the same into engagement with the diaphragm 52 at all times. A spring pressed pawl 62 is pivoted on the rocker arm at 63 and has engagement with a ratchet 64 on the lower end of the screw 46 whereby to turn the screw through a small angle in each oscillation of the rocker arm.

In operation, at the time the meat to be barbecued is placed in the broiler drawer, the reservoir 49 is filled with water—either hot or cold, hot water being preferable because it gives quicker starting. The steam generated by the heating of the tube 53 by the burner 14 or electric heating element while the meat is being barbecued by said burner or heating element builds up pressure in the dome 54, and this pressure causes the diaphragm 52 to be forced outwardly, thus operating the rocker arm 58 to give a partial turn to the screw 46 to turn the spit 22'. When the diaphragm has been forced outwardly to an extreme position, the valve 55 opens and relieves the pressure, only steam being permitted to escape. As the pressure is released, the spring 61 returns the diaphragm 52 and arm 58 to its normal position. After the valve 55 closes, pressure begins to build up again due to the further heating of the tube 53, and the operation described is repeated. One filling of the reservoir 49 is easily sufficient to take care of a complete barbecuing operation.

In the barbecuing of steaks and hamburger, I contemplate the use of a grill like that shown at 65 in Fig. 7 which is preferably interchangeable with the spits 22 and 22' shown in Figs. 1 and 4, the grill 65 having a rod 22a welded or otherwise suitably secured to one of the two separable grill sections in substantially diagonal relationship thereto, as shown. The rod 22a carries a gear 42a for meshing engagement either with the rack 43 in Fig. 1 or the screw 46 in Fig. 4 and has a handle 41a on the front end thereof. The rod 22a is adapted to engage in any one of the holes 30 in the rear wall of the broiler drawer for support at one end, and is adapted to engage in any one of the notches 29 in the bracket 24, or any one of the notches 29' in the bracket 24', for support at the other end.

It is believed the foregoing description conveys a good understanding of the objects and advantages of my invention. The appended claims have been drawn to cover all legitimate modifications and adaptations.

I claim:

1. A device of the class described comprising, in combination, a support having a bottom and spaced substantially parallel side walls and an end wall in transverse relation thereto, the end wall having a hole provided therein near one of the side walls, a bracket detachably secured to the inner side of the other side wall in remote relation to the end wall and having a notch provided therein in approximate horizontal alignment with the aforesaid hole for rotatable support on a substantially horizontal axis of a rotary spit member, and a rotary spit member removably engaged at one end in the hole and at the other end in the notch for support in a position substantially diagonally relative to the bottom of said support and in vertically spaced relation thereto, the rotary spit member being removable through the open end of said support.

2. A device of the class described comprising, in combination, a support having a bottom and spaced substantially parallel side walls and an end wall in transverse relation thereto, the end wall having a hole provided therein near one of the side walls, a bracket detachably secured to the inner side of the other side wall in remote relation to the end wall and having a notch provided therein in approximate horizontal alignment with the aforesaid hole for rotatable support on a substantially horizontal axis of a rotary spit member, a rotary spit member removably engaged at one end in the hole and at the other end in the notch for support in a position substantially diagonally relative to the bottom of said support and in vertically spaced relation thereto, the rotary spit member being removable through the open end of said support, a handle on the front end of the rotary spit member accessible through the open end of said support for turning said member, and means for releasably locking said member in adjusted position.

3. The combination with an open ended drawer for a cooking range having an inner end wall and opposed side walls, of a barbecuing attachment for the drawer, comprising a bracket of generally L-shaped horizontal section having one of the arms of the L for engagement with the side wall of the drawer, fastening means for securing the bracket to said side wall, said bracket having on the other arm of the L a plurality of vertically spaced notches provided therein for demountable support thereon of a rotatable spit member, and said drawer having vertically spaced holes provided in the inner end wall thereof remote from the bracket for engagement in any one of said holes of the rotary spit member, and a rotary spit member removably engageable at one end in one of said holes and at the other end in one of said notches.

4. A barbecuing attachment as set forth in claim 3, including a substantially vertical rack on the bracket in laterally spaced relation to the notches therein, a gear on the spit member arranged for meshing engagement with the rack when the spit member is disposed in any one of the notches, and a handle on the end of the spit member for disengaging the same from the bracket and turning the spit member before reengaging it on the bracket with the gear meshed with the rack.

5. A barbecuing attachment as set forth in claim 3, including a screw rotatably mounted on the bracket substantially vertically in laterally spaced relation to the notches therein, a gear on the spit member arranged for meshing engagement with the screw when the spit member is disposed in any one of the notches, and means for turning the screw.

6. A barbecuing attachment as set forth in claim 3, including a screw rotatably mounted on the bracket substantially vertically in laterally spaced relation to the notches therein, a gear on the spit member arranged for meshing engagement with the screw when the spit member is disposed in any one of the notches, and power operated means for turning the screw.

7. A barbecuing attachment as set forth in claim 3, including a screw rotatably mounted on the bracket substantially vertically in laterally spaced relation to the notches therein, a gear on the spit member arranged for meshing engagement with the screw when the spit member is disposed in any one of the notches, and steam propelled means for turning the screw, said means including a steam generator extending from the bracket in spaced relation to the spit member and arranged to be heated by the same heat source used in the barbecuing of meat on the spit member.

8. In a range, the combination of a heating element in a compartment in said range, a rotary barbecuing device in said compartment for rotatably supporting meat to be barbecued in the heat zone of the heating element, a single stroke, load and fire type steam propulsion mechanism including a part movable in one direction on working strokes and in the opposite direction on idle strokes and operatively associated to communicate intermittent rotation in one direction to the barbecuing device, and a steam generator connected with said mechanism in the heat zone of the heating element.

9. In a range, the combination of a heating element in a compartment in said range, a rotary barbecuing device in said compartment for rotatably supporting meat to be barbecued in the heat zone of the heating element, a steam generator in the heat zone of the heating element, a rotatable screw in mesh with a gear on the barbecuing device, a pressure responsive diaphragm subject to the steam pressure of said generator, a pressure responsive relief valve for releasing the steam pressure, and means operated by the movement of said diaphragm for intermittently turning the screw.

10. In a gas range comprising a broiler compartment, a broiler drawer therein having a back wall and side walls, and a burner in the upper portion of said compartment over the drawer, a barbecuing spit member, means comprising a bracket detachably secured to one side wall of the drawer near the front end thereof for demountably supporting one end portion of said spit member in a substantially horizontal position in the drawer, and means on the back wall of the drawer near the opposite side wall for demountably supporting the other end portion of said spit member, whereby said spit member is supported extending diagonally from one front corner to the opposite rear corner of the drawer.

11. As an article of manufacture, a bracket for supporting a barbecuing spit in a broiler drawer, comprising a body of generally L-shaped section, the body having one arm of the L formed to provide a plurality of vertically spaced notches adapted to receive the spit member therein at any one of a number of elevations, the other arm of the L being formed to provide vertically spaced, elongated, substantially horizontal projections in substantially parallel relation to one another for engagement in between ledges in the side wall of a broiler drawer, at least one of said projections having a threaded stud projecting therefrom intermediate the ends thereof for projection through a hole provided in the side wall of the broiler drawer.

12. As an article of manufacture, a bracket for supporting a barbecuing spit in a broiler drawer, comprising a body of generally L-shaped section, the body having one arm of the L formed to provide a plurality of vertically spaced notches adapted to receive the spit member therein at any one of a number of elevations, the other arm of the L being formed to provide vertically spaced, elongated, substantially horizontal projections in substantially parallel relation to one another for locating engagement in between ledges in the side wall of a broiler drawer on which the bracket is adapted to be supported, and a rack on the first mentioned arm of said L in a plane substantially at right angles to the plane of the arm and in spaced substantially parallel relation to the notched portion thereof.

13. As an article of manufacture, a bracket for supporting a barbecuing spit in a broiler drawer, comprising a body of generally L-shaped section, the body having one arm of the L formed to provide a plurality of vertically spaced notches adapted to receive the spit member therein at any one of a number of elevations, the other arm of the L being formed ot provide vertically spaced, elongated, substantially horizontal projections in substantially parallel relation to one another for locating engagement in between ledges in the side wall of a broiler drawer on which the bracket is adapted to be supported, a screw on the first mentioned arm of said L in spaced substantially parallel relation to the notched portion of said arm, and means on said arm for turning said screw.

14. A device of the class described comprising, in combination, a support having a bottom and spaced substantially parallel side walls and an end wall in transverse relation thereto, the end wall having vertically spaced holes provided therein near one of the side walls, a bracket detachably secured to the inner side of the other side wall in remote relation to the end wall and having a plurality of notches provided therein in approximately horizontal alignment with the respective holes in the end wall for rotatable support on a substantially horizontal axis of a rotary spit member, and a rotary spit member removably engaged at one end in one of the holes and at the other end in a related notch for support in a position substantially diagonally relative to the bottom of said support and in vertically spaced relation thereto, the rotary spit member being removable through the open end of said support.

15. As an article of manufacture, a bracket for supporting a barbecuing spit in a broiler drawer, comprising a body of generally L-shaped section, the body having one arm of the L formed to provide a plurality of vertically spaced notches adapted to receive the spit member therein at any one of a number of elevations, the other arm of the L being formed to provide vertically spaced, elongated, substantially horizontal projections in substantially parallel relation to one another for engagement in between ledges in the side wall of a broiler drawer, and means whereby said bracket is adapted to be secured in position on the side wall of the broiler drawer.

16. A broiler compartment, a broiler drawer therein having a bottom and spaced substantially parallel side walls and a rear end wall in transverse relation thereto, the end wall having a hole provided therein near one of the side walls, a bracket secured to the inner side of the other side wall in remote relation to the end wall and having a notch provided therein in approximate horizontal alignment with the aforesaid hole for rotatable support on a substantially horizontal axis of a rotary spit member in a position substantially diagonally relative to the broiler drawer, and a rotary spit member removably engaged at one end in the hole and at the other end in the notch for support, the rotary spit member being removable through the open end of said broiler drawer.

17. A broiler compartment, a broiler drawer therein having a bottom and spaced substantially parallel side walls and a rear end wall, the end wall having a plurality of vertically spaced holes provided therein adjacent to one side, a bracket secured to the inner side of the side wall opposite from said holes and in remote relation to the end wall and having a plurality of vertically spaced notches provided therein each in approximate horizontal alignment with one of the aforesaid holes, a rotary spit member removably engaged at one end in a hole and at the other end in a notch for support whereby the spit member is diagonally disposed in the broiler drawer, the rotary spit member being removable through the open end of said broiler drawer, a handle on the front end of the rotary spit member accessible through the open end of said broiler drawer for turning the same, and means for releasably locking said member in adjusted position when the spit member is disposed in any one of the notches.

18. The combination with an open ended drawer for a cooking range having an inner end wall and opposed side walls, the side walls being provided with vertically spaced ledges for demountably supporting a drip pan at any one of a plurality of elevations, of a barbecuing attachment for the drawer, comprising a bracket having a plurality of vertically spaced projections on one side thereof for engagement between the vertically spaced ledges on one side wall, said side wall having a hole provided therein and said bracket having fastening means provided thereon removably engageable in said hole, said bracket also having a plurality of vertically spaced notches provided therein for demountable support thereon of a rotatable spit member, and said drawer having vertically spaced holes provided in the inner end wall thereof remote from the bracket for engagement in any one of said holes of the rotary spit member, and a rotary spit member removably engageable at one end in one of said holes and at the other end in one of said notches.

19. In a cooking range, in combination, a broiler compartment, a broiler drawer in said compartment, a rotary spit, and means rotatably supporting the spit in said broiler drawer including a supporting unit attached to the drawer for supporting the front end of the spit with the latter extending from a front corner of the drawer diagonally across to the opposite corner thereof, means at said opposite corner supporting the rear end of the spit in the broiler drawer, and means coacting between the supporting unit and the rotary spit to hold the latter in any of a number of rotative positions selected by the operator.

20. In a cooking range, in combination, a broiler compartment, a broiler drawer having upright side walls provided with pan supporting ledges, a rotary spit, and means rotatably supporting the spit diagonally across the broiler drawer including a supporting unit for the front end of the spit removably attached to one of the side walls and having supporting members fitting between ledges in the adjacent side wall, means supporting the rear end of the spit in the broiler drawer adjacent the other side wall, and means coacting between the spit and the supporting unit and operable to impart rotative movement to the spit.

JOHN F. HENNESSY.